Patented Aug. 16, 1938

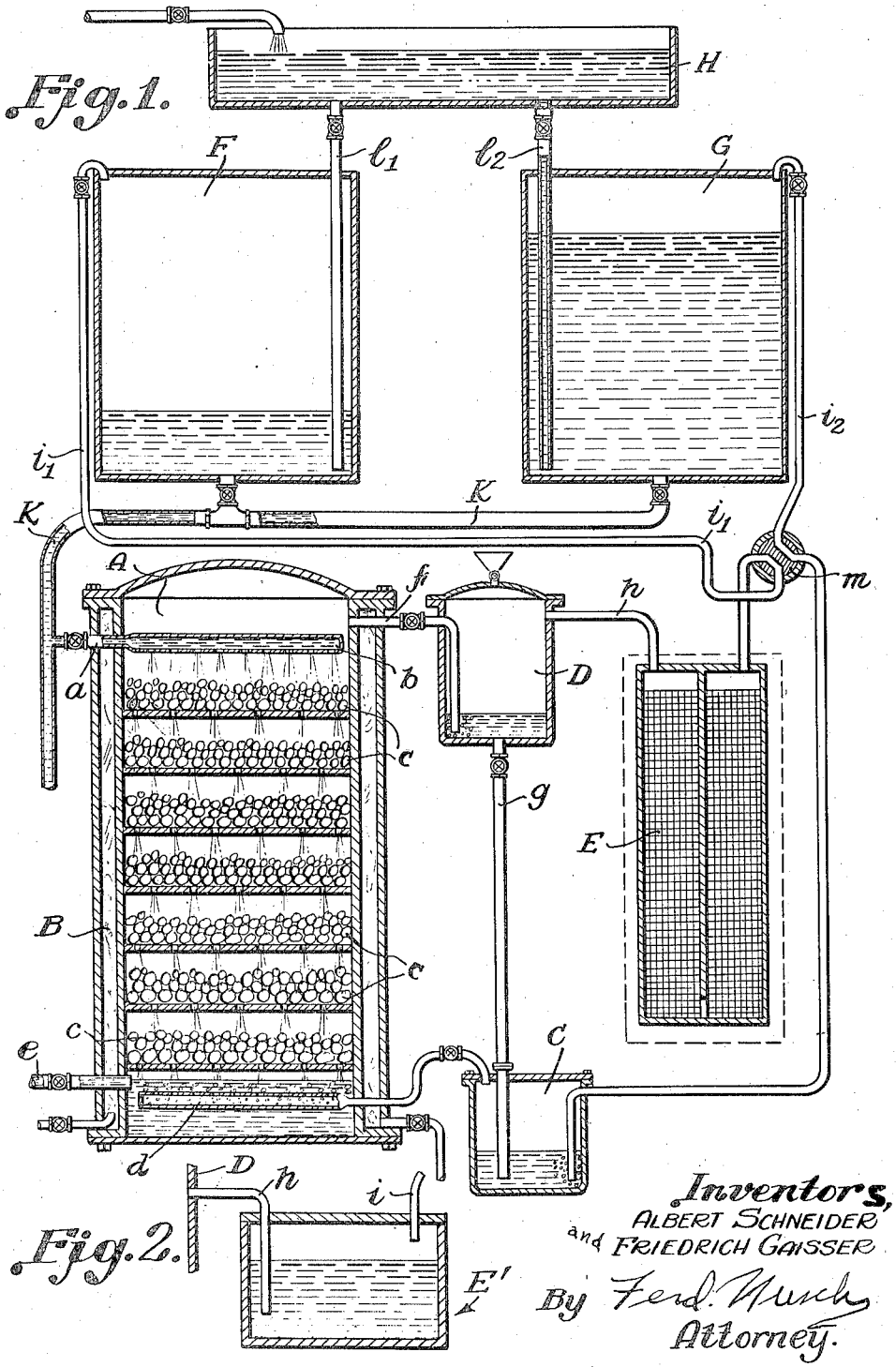

2,127,450

UNITED STATES PATENT OFFICE 2,127,450

PROCESS FOR PREPARING WATER FOR INDUSTRIAL PURPOSES OF ALL KINDS, ESPECIALLY BOILER FEED WATER

Albert Schneider and Friedrich Gaisser, Stuttgart, Germany

Application January 22, 1934, Serial No. 707,814
In Germany January 21, 1933

10 Claims. (Cl. 210—16)

(Granted under the provisions of sec. 14, act of March 2, 1927; 357 O. G. 5)

The preparation of a perfect water for industrial purposes of all kinds, especially for boiler feed water, has for years been the aim of the water specialists, and it is surprising that no radical solution of this problem has been discovered. The difficulties which prevent the solution of this problem can be best understood, if the conditions to be fulfilled by an absolutely pure water are considered. These are as follows:—

1. The calcium oxide and magnesium oxide which cause the hardness of the water and the heavy metal salts which have become soluble owing to the corrosion phenomena must be completely eliminated.
2. The water must be entirely freed from carbon dioxide and oxygen.
3. The water, after having been softened, should show the least possible residue after evaporation.
4. The purified water must not contain any soda.
5. The purified water must not contain any caustic soda.
6. The purified water must not contain any free acid.
7. The purified water should have a weak alkaline reaction.
8. The process must be economical.

A process, which fulfils all these requirements, is not shown up to the present. It is true, that there are many processes which cause a complete softening on the one hand and a complete degasification of the raw water on the other hand. Only few processes are known, which are capable of meeting both these requirements, whereas at least two of the above mentioned conditions are not fulfilled.

The process hereinafter described, which employs exclusively gaseous substances for the purification of the water, fulfills all eight conditions, the whole effect being attained in a single operation.

The process consists essentially in that in a cylindrical vessel the raw water is allowed to trickle over iron filings, granulated iron ore, suitable shaped bodies of porous clay and the like contained in the cylindrical vessel, gas in countercurrent being introduced into the vessel from below and at the same time the water is heated to a temperature of about 30° C. and more from the outer side or from the inner side of the vessel by means of a steam jacket or waste gases.

The gas is chiefly nitrogen or better still, sulphuretted hydrogen, to which a small quantity of ammonia gas is added, and frees the water from free carbon dioxide by forming ammonium carbonate by chemical means, whereas oxygen is carried off mechanically. The gas laden with oxygen then passes through a reducing vessel (solution of sodium hydrosulphite of pyrogallol) or a heated tube containing a bare metal, such as copper powder, and then again enters the apparatus. There is no loss of sulphuretted hydrogen or nitrogen. The bicarbonates of calcium or magnesium present in the raw water are partly converted into carbonate already by the heating, and precipitate. The remainder is precipitated by the ammonium carbonate which is formed. This reaction is considerably accelerated by the presence of iron, iron filings, granulated iron ore or the like.

The chloride- and sulphate ions present in the raw water are bound on the ammonia and are harmless in boiler service, partly even desirable.

For the sake of simplicity the ammonia may be added right from the outset by introducing ammonia gas into or adding an aqueous solution thereof to the raw water. An accurate dosing is not necessary because any excess will be removed by the circulating gas current. The process will be hereinafter explained by way of example by describing a practical experiment with reference to the accompanying drawing.

In the drawing:

Figure 1 diagrammatically illustrates a plant for carrying out the process, and wherein the gaseous fluid after leaving the condenser is conducted through a tube system containing bare metal; and Figure 2 is a detail sectional view showing the gaseous fluid after leaving the condenser being conducted through a tank containing alkaline pyrogallol or sodium hydrosulphite or the like.

A raw water, having a total hardness of 31° German hardness, 639 p. p. m. residue from drying, 446 p. p. m. residue from glowing, 234 p. p. m. calcium oxide and 54.6 magnesium oxide, enters at $a$ into a reaction cylinder A of the plant through a device in the form of a sprinkler $b$. This cylinder A is surrounded by a steam jacket B. The water trickles over granulated iron or iron ore $c$ arranged in layers on a plurality of superposed parallel perforated plates. Sulphuretted hydrogen or nitrogen laden with ammonia from a vessel C is supplied from below in counterflow to the water from a perforated pipe $d$. The water leaves the reaction cylinder A at $e$ and passes on to a filter. The gas charged with oxygen and excess ammonia leaves the cylinder A at $f$ and is conducted through a condenser D which serves as ammonia separator. The ammonia water formed in the condenser D is drained off from time to time through a cock $g$ into the ammonia vessel C.

The gas leaves the condenser D at $h$ and is conducted through a heated tube or tube system E containing a bare metal, for example copper. A washing vessel E' shown in Figure 2 containing alkaline pyrogallol or sodium hydrosulphite may be provided, instead of this tube or tube system. The gas is in this manner freed from oxygen and flows through a conduit $i_1$ into a gasometer F filled with water. During this procedure the water is drained from this gasometer F through a conduit $k$, and, if desired, may be returned into a water tank H by a pump. At the same time the water from the tank H forces the gas out of the gasometer G and through a conduit $i_2$ into the ammonia vessel C. When the gasometer F is full of gas, the gasometer G is full of water. The cocks of the conduits $i_1$, $i_2$, $k$, $l_1$ and $l_2$ are then reversed automatically or by hand so that the gas then flows back into the ammonia vessel C, whereas the gas from the apparatus returns into the gasometer G. Instead of employing two gasometers, a gas pump may be employed for circulating the gas current through the reaction cylinder. The alternate charging and discharging of the gasometers is effected by a simple reversing cock $m$. If the whole apparatus is gas-tightly closed, there can be no loss of gas.

The water leaving the apparatus at $e$ and subsequently filtered has a dry residue of 352 to 251 p. p. m., a residue from glowing of 167 to 130 p. p. m., whereas the total hardness is reduced to 0°. The purified water reacts on phenolphthalein (pH-value about 7.7 to 8), and can consequently not contain any carbon dioxide. A considerable quantity of sulphate is also precipitated as calcium sulphate, as shown by the residues from drying and flowing, which are lower than when substances causing the hardness had been precipitated.

We claim:—

1. A process for preparing water for industrial purposes, consisting in passing the water fluid in finely divided state through a suitably heated apparatus, introducing a constant flow of neutral gaseous fluid in finely divided condition into the apparatus in counter-flow to the water, and adding at the beginning of the process ammonia to at least one of the two fluids before entering the apparatus to attain the precipitation of the Ca and Mg hardness formers as insoluble carbonates, at the same time expelling from the water the carbon dioxide, the added ammonia and newly formed ammonium carbonate in the form of gases, and adding these gases to at least one of the said two fluids for continuing the dehardening process.

2. A process as specified in claim 1, in which the ammonia is added in aqueous solution to the water to be purified.

3. A process as specified in claim 1, in which the ammonia gas is added to the neutral gaseous fluid by passing this neutral gaseous fluid through a vessel containing an aqueous ammonia solution.

4. A process as specified in claim 1, in which the water to be purified is trickled over granulated iron to increase the surface of the water exposed to the action of the gas, accelerate the precipitation of the hardness formers, render harmless the residues of oxygen and at the same time filter the gas and free it from its water particles.

5. A process as specified in claim 1, in which the gas after acting on the raw water and leaving the apparatus is passed over bare metal in finely divided glowing state to neutralize the oxygen removed from the treated water.

6. A process as specified in claim 1, in which the gas before being returned into the heated apparatus is passed over bare metal in finely divided glowing state to separate the oxygen from the gas current.

7. A process as specified in claim 1, in which the gaseous fluid, after leaving the heated apparatus, is passed through a basic pyrogallol solution to chemically bind the oxygen extracted from the water by the gas during its passage therethrough.

8. A process as specified in claim 1, in which the gaseous fluid, before being returned into the heated apparatus is passed through a basic pyrogallol solution to remove the oxygen.

9. A process as specified in claim 1, in which the gaseous fluid after leaving the heated apparatus is passed through a sodium hydrosulphite solution to chemically bind the oxygen extracted from the water by the gas during its passage therethrough.

10. A process as specified in claim 1, in which the gaseous fluid before being returned into the heated apparatus is passed through a sodium hydrosulphite solution to remove the oxygen.

ALBERT SCHNEIDER.
FRIEDRICH GAISSER.